UNITED STATES PATENT OFFICE.

WILLIAM CROOKES, OF WINE OFFICE COURT, LONDON, ENGLAND.

IMPROVED METHOD OF SEPARATING GOLD AND SILVER FROM ORES.

Specification forming part of Letters Patent No. 54,829, dated May 15, 1866.

*To all whom it may concern:*

Be it known that I, WILLIAM CROOKES, F. R. S., of Wine Office Court, in the city of London, England, have invented certain Improvements in Extracting and Separating Gold and Silver from their Ores or Matrices, and in the treatment of mercury employed for such purposes; and I do hereby declare that the following is a full and exact description thereof.

This invention relates to certain improvements in the method of treating ores or substances containing gold and silver by amalgamation, and also in the treatment of mercury employed in such operations. It is well known that the extraction and separation of gold and silver by the process of amalgamation from the substances with which they are combined is much impeded or rendered costly by the mercury employed becoming converted into sulphide, chloride, sulphate, or other compound, or into minute globules technically known as "flouring" or "powdering," and also by its being partially deprived of its fluidity, technically termed "sickening," and thereby losing its power of adhering to or taking up the precious metal under treatment.

In order to obviate these evils, I add to the mercury used for amalgamation certain metallic substances—that is to say, zinc, tin, and cadmium, either separately or in combination, and either in the form of an amalgam with mercury or directly in the pure metallic state; or, instead of so combining those metals, or any or either of them, with the mercury in the first instance, they can be reduced electro-chemically from compounds, so as to unite with the mercury in the act of separating; or ores of or compounds containing the same may be mixed with the ores or substances containing the precious metal and the whole ground together and submitted to the action of mercury in which a metal has been dissolved or reduced, which is capable of reducing to the metallic state the metal which it is desired so to introduce in order to assist and facilitate the process of extracting and separating the precious metal. In either of these modes of combining the before-mentioned metals, or any or either of them, with the mercury used for amalgamation, the result will be to protect the mercury from chemical action, and also to prevent the flouring or powdering or sickening of the latter, and also to increase its tendency to unite together into large globules.

I may also mention that in silver amalgamation the action of the metals in the mercury is principally chemical, while in gold amalgamation the zinc, cadmium, tin, and other metals appear to act more mechanically and physically than in the former case.

It may be here mentioned that although zinc, tin, and cadmium have been hereinbefore mentioned as being applicable to the purposes of this invention, yet aluminium, iron, manganese, copper, lead, thallium, cobalt, and nickel may also be employed with like results. The price or physical or chemical properties of the last-mentioned metals, however, renders them at present practically unavailable for use on a large and commercial scale.

I am aware that iron in the metallic state has already been employed in the process of silver amalgamation; but its action as hitherto used is different from what it is when added in the form of an amalgam with mercury, either with or without any of the other metals hereinbefore mentioned.

With regard to the proportions in which the aforesaid metals should be combined with the mercury or with each other, it is impossible to fix any precise limits, as the operator must be guided by his skill and experience and the condition of the substances containing the precious metals under treatment.

A further mode of treating mercury with the object of rendering it better fitted for the purposes of amalgamation during the process of trituration consists in placing it in connection with the zinc or negative pole of an electrical battery, or in subjecting it to such chemical agencies as will be calculated to liberate nascent hydrogen on its surface by the decomposition of the liquid in which the mercury rests.

My said invention further consists in maintaining or restoring the bright metallic condition of the mercury employed in the amalgamation of gold by the addition thereto of a small quantity of cyanide of potassium during the operation of grinding.

Having thus declared the nature of my said invention and the manner in which it is to be performed, I would observe, in conclusion, that what I consider novel and original, and therefore claim as constituting my said invention, is—

The employment of zinc, tin, and cadmium, and such other metals as hereinbefore mentioned, and also of such several processes for the extraction and separation of gold and silver from the ores and substances containing them, and for the treatment of mercury employed for such purposes, as hereinbefore substantially set forth and described.

WILLIAM CROOKES.

Witnesses:
R. S. M. VAUGHAN,
    54 *Chancery Lane.*
J. B. WYNN,
    24 *Royal Exchange, London.*